US009256883B2

(12) United States Patent
Rakesh et al.

(10) Patent No.: US 9,256,883 B2
(45) Date of Patent: Feb. 9, 2016

(54) METHOD AND APPARATUS FOR PLANNING A SCHEDULE OF MULTIMEDIA ADVERTISEMENTS IN A BROADCASTING CHANNEL

(75) Inventors: Chakraborty Rakesh, West Bengal (IN); Yeluri Pravin, Maharashtra (IN); Sahu Suman, West Bengal (IN)

(73) Assignee: VUBITES INDIA PRIVATE LIMITED, Mumbai, Maharahstra (IN)

( * ) Notice: Subject to any disclaimer, the term of this patent is extended or adjusted under 35 U.S.C. 154(b) by 0 days.

(21) Appl. No.: 13/266,803

(22) PCT Filed: Apr. 28, 2010

(86) PCT No.: PCT/IN2010/000268
§ 371 (c)(1),
(2), (4) Date: Oct. 28, 2011

(87) PCT Pub. No.: WO2010/125579
PCT Pub. Date: Nov. 4, 2010

(65) Prior Publication Data
US 2012/0060185 A1 Mar. 8, 2012

(30) Foreign Application Priority Data
Apr. 28, 2009 (IN) .......................... 1123/MUM/2009

(51) Int. Cl.
| | | |
|---|---|---|
| G06Q 10/00 | (2012.01) |
| H04N 7/025 | (2006.01) |
| G06Q 30/02 | (2012.01) |
| H04N 21/81 | (2011.01) |
| H04N 21/2668 | (2011.01) |
| H04N 21/234 | (2011.01) |

(52) U.S. Cl.
CPC .......... *G06Q 30/02* (2013.01); *H04N 21/23424* (2013.01); *H04N 21/2668* (2013.01); *H04N 21/812* (2013.01)

(58) Field of Classification Search
CPC .......... G06Q 30/0251; G06Q 30/0269; H04N 21/26241; H04N 21/2668; H04N 21/234245; H04N 21/812; H04N 21/23424
USPC ............. 725/32–61; 705/14.01–14.73, 14.49, 705/14.5, 14.69
See application file for complete search history.

(56) References Cited

U.S. PATENT DOCUMENTS

| | | | |
|---|---|---|---|
| 7,370,002 B2 * | 5/2008 | Heckerman et al. ........ 705/14.41 |
| 2004/0268387 A1 * | 12/2004 | Wendling .......................... 725/35 |
| 2007/0162926 A1 * | 7/2007 | Steelberg et al. ............... 725/34 |
| 2009/0006145 A1 * | 1/2009 | Duggal et al. ..................... 705/6 |
| 2009/0076894 A1 * | 3/2009 | Bates et al. ...................... 705/14 |
| 2009/0313652 A1 * | 12/2009 | Connery et al. ................ 725/32 |

* cited by examiner

*Primary Examiner* — Benjamin R Bruckart
*Assistant Examiner* — Carmine Malangone

(57) ABSTRACT

Various embodiments of the invention comprise a method and apparatus for planning a schedule of a multimedia advertisement across one or more broadcasting channels is disclosed. In one embodiment, the method includes accessing user data, processing survey data using the user data, generating a file having a list of one or more broadcasting channels using analyzed survey data, and scheduling a multimedia advertisement across the one or more broadcasting channels. Additionally, the file includes one or more inventory spots associated with the one or more broadcasting channels. The method further includes assigning the multimedia advertisement to the one or more inventory spots associated with the one or more broadcasting channels.

17 Claims, 5 Drawing Sheets

Create Campaign | View Campaign

Select spot for your plan

Quick Plan

Budget : 83933(Rs)
Planned : 0(Rs)
Remainder: 83933(Rs)
Show campaign details

⬇ ⬆ Mumbai

| Channel | Programme | Day | Time | Score | TVR | Rate / 10 Sec INR | 30s | GRP | Total cost INR |
|---|---|---|---|---|---|---|---|---|---|
| A | 1 | St,Su | 19:00-22:00 | 47 | 0.2 | 480 | ☐ | | |
| B | 2 | St,Su | 19:00-22:00 | 45 | 0.2 | 800 | ☐ | | |
| C | 3 | Su | 19:00-22:00 | 41 | 0.2 | 420 | ☐ | | |
| D | 4 | Su | 19:00-22:00 | 36 | 0.2 | 700 | ☐ | | |
| E | 5 | St,Su | 19:00-22:00 | 35 | 0 | 200 | ☐ | | |
| F | 6 | Su | 19:00-22:00 | 34 | 0 | 315 | | | |
| | | | | | | Total | Seconds | Spot | Grp | Cost |

Exports xls | pdf

Copyright© 2008 Vubites India Pvt. Ltd. All Rights Reserved

Figure 3A

Pick TV spots to air your ads

Select a ad length to assign  (10)  (20)  (30)  (X)

Budget      Rs 78999
Planned     Rs 1200
RemainderRs 77799
Show campaign details ■ Available   ☐ Selected ⬇ Delhi ⬆

| Channel | Programme | Day | Time | Score | TVR | Rate / 10 Sec | 27 Sat | 28 Sun | 29 Mon | 30 Tue | Total Spots | GRP | Total Cost INR |
|---------|-----------|-----|------|-------|-----|---------------|--------|--------|--------|--------|-------------|-----|----------------|
| A | 1 | M,Tu,W,Th,Fr | 17:00 - 19:00 | 50 | 0.5 | 240 | ☐ | ☐ | ■ | ■ | 0 | 0.00 | 0 |
| B | 2 | M,Tu,W,Th,Fr | 17:00 - 19:00 | 48 | 0.2 | 400 | ☐ | ☐ | 30 | ■ | 1 | 0.20 | 1200 |
| C | 3 | St,Su | 13:00 - 15:00 | 37 | 0.1 | 460 | ■ | ■ | ☐ | ☐ | 0 | 0.00 | 0 |
| D | 4 | M,Tu,W,Th,Fr | 13:00 - 15:00 | 37 | 0.3 | 350 | ☐ | ☐ | ■ | ■ | 0 | 0.00 | 0 |
| E | 5 | M,Tu,W,Th,Fr | 09:00 - 12:00 | 50 | 0.2 | 300 | ☐ | ☐ | ☐ | ■ | 0 | 0.00 | 0 |
| F | 6 | M,Tu,W,Th,Fr | 19:00 - 22:00 | 48 | 0.4 | 600 | ☐ | ☐ | ■ | ■ | 0 | 0.00 | 0 |

Mkt Total Sec:     M Total     1     0.2     1200

Save Plan    Refreshing Inventory

Exports xls | pdf

Copyright© 2008 Vubites India Pvt. Ltd. All Rights Reserved

Figure 3B

METHOD AND APPARATUS FOR PLANNING A SCHEDULE OF MULTIMEDIA ADVERTISEMENTS IN A BROADCASTING CHANNEL

CROSS-REFERENCE TO RELATED APPLICATIONS

This application claims benefit of Indian provisional patent application serial number 1123/MUM/2009, filed on Apr. 28, 2009, which is herein incorporated by reference.

FIELD OF THE INVENTION

Embodiments of the present invention generally relate to media planning techniques and more particularly to a method and apparatus for planning a schedule of multimedia advertisement in a broadcasting channel.

DESCRIPTION OF THE RELATED ART

In today's highly competitive market, business organizations such as, service providers or product providers, small to medium sized organizations, freelancing groups and/or the like, need to reach out new and/or potential customers. As such, the business organizations typically generate one or more multimedia advertisements, which depict their services or products.

Accordingly, the business organizations promote the multimedia advertisements through various types of broadcasting channels, such as, television channels, radio channels, video on demand service channels, online video streaming channels, internet television channels, and/or the like. Further, each broadcasting channel may include its respective target audience, such as service and/or product consumers.

However, the respective target audience of the various broadcasting channels may vary during different time-intervals of a day. For example, the broadcasting channel may include a target audience of age group ranging from 10 to 15 years during an evening of the day. Moreover, the various broadcasting channels charge heavily for promoting the multimedia advertisements that may vary during the different intervals of time. Furthermore, the business organizations may face high financial burden in order to promote their products and/or services using multimedia advertisement through the broadcasting channels.

Therefore, there is a need in the art for a method and apparatus for selecting the broadcasting channels and further planning a schedule of the multimedia advertisement across various broadcasting channels.

SUMMARY

Various embodiments of the invention comprise a method and apparatus for planning, scheduling, booking and assigning of a multimedia advertisement across one or more broadcasting channels. In one embodiment, the method includes accessing user data, processing survey data using the user data, generating a file having a list of one or more broadcasting channels using analyzed survey data, and scheduling a multimedia advertisement across the one or more broadcasting channels. Additionally, the file includes one or more inventory spots associated with the one or more broadcasting channels. The method further includes assigning the multimedia advertisement to the one or more inventory spots associated with the one or more broadcasting channels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A illustrates a graphical user interface (GUI) in accordance with an embodiment of the invention;

FIG. 3B illustrates a graphical user interface (GUI) in accordance with another embodiment of the invention.

DETAILED DESCRIPTION

Figure 1:
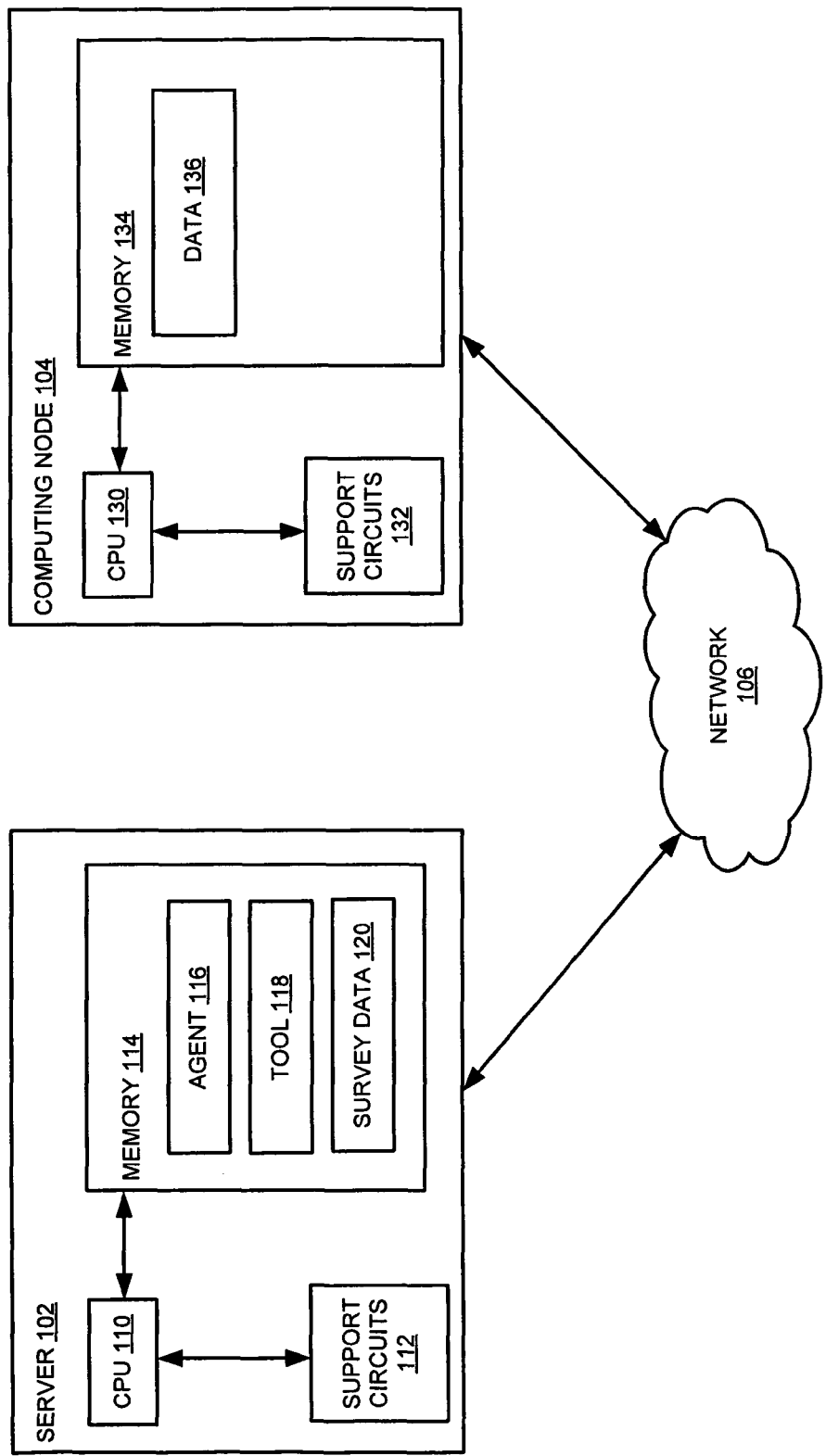
FIG. 1 is a block diagram of a system for planning a schedule of a multimedia advertisement in one or more broadcasting channels in accordance with an embodiment of the invention.

FIG. 1 is a block diagram of a system 100 for planning a schedule of a multimedia advertisement in one or more broadcasting channels according to various embodiments of the invention. The system 100 comprises a server 102 and a computing node 104 coupled to each other through a network 106. The system 100 provides access to a user for various computing resources for planning a schedule of a multimedia advertisement in one or more broadcasting channels. It is appreciated that the system 100 can comprise one or more servers 102 and/or one or more computing nodes 104 coupled via the network 106.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or intranet using various communications infrastructure such as Ethernet, WiFi, WiMax, General Packet Radio Service (GPRS), and the like. Furthermore, the network 106 may form a portion of a Storage Network Area (SAN) using various communications infrastructure such as Ethernet, Fiber Channel, InfiniBand, iSCSI and the like.

The server 102 is a type of computing device (e.g., a laptop, a desktop, a Personal Digital Assistant (PDA) and/or the like), such as those generally known in the art. The server 102 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 comprises at least one of Read Only Memory (ROM), Random Access Memory (RAM), disk drive storage, optical storage, removable storage and/or the like. The memory 114 includes an agent 116, a tool 118, and survey data 120.

The computing node 104 is a type of computing device (e.g., a laptop, a desktop, a Personal Digital Assistant (PDA) and/or the like), such as those generally known in the art. The computing node 104 includes various computing resources, such as application resources, replication resources, database resources, network resources, storage resources and/or the like. Furthermore, the computing node 104 includes a Central Processing Unit (CPU) 130, various support circuits 132 and a memory 134.

The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 comprises at least one of Read Only Memory (ROM), Random Access Memory (RAM), disk drive storage, optical storage, removable storage and/or the like. The memory 134 includes among other data resources, a user data 136.

Generally, the data 136 includes user campaign data for the multimedia advertisement and may include information regarding target audience, business category, industry specification, user's preference (e.g., demographic location, broadcasting channels preference) and/or the like. In one embodiment, the data 136 includes multimedia advertisement scheduling data, such as, campaign timing data (e.g., day, date, and time), number of spots requirement, and/or the like. Additionally, the data 136 includes one or more multimedia advertisement files, a plurality of library files and/or like. The library files can include various image files, video files, audio files, text files and/or the like.

According to various embodiments of the invention, the agent 116 is configured to provide an interface to the user for planning a schedule of the multimedia advertisement. The agent 116 includes various software packages that access the data 136 The survey data 120 includes an update data such as, television ratings data, market reviews and/or analysis data of one or more spots and/or the like, for the one or more broadcasting channels. The tool 118 may be an analytical tool, a statistical tool, a mathematical tool and/or the like and tool is configured to process the survey data 120.

Generally, the agent 116 extracts information (herein afterwards referred to as a first information) from the user data 136 and communicates the first information to the tool 118. The tool 118 extracts information (herein afterwards referred to as a second information) from the survey data 120 using the first information. Further the tool 118 generates a file having a list of one or more broadcasting channels that may be available for scheduling of the multimedia advertisement.

In one or more embodiments, the tool 118 is configured to generate a number of available inventory spots in one or more broadcasting channels in accordance with the first information and the second information. In some embodiments, the first information may include a range of target audiences provided by the user. Subsequently, the tool 118 is configured to process the survey data 120 using the first information (i.e., range of the target audience). Further, the tool 118 is configured to generate the second information that includes a list having one or more broadcasting channels according to the range of the target audiences. in addition, the agent 116 provides access to the file having a list of one or more broadcasting channels to the user through a user interface, such as, a graphical user interface (GUI), command line interface (CLI) and/or the like. The user plans the scheduling of the multimedia advertisement by selecting the one or more inventory spots for the one or more broadcasting channels.

According to one or more embodiments of the invention, the tool 118 generates a file having a list of one or more broadcasting channels in accordance with the following algorithms. In one example, the list of the one or more broadcasting channels is arranged according to Cost Per Rating Point (CPRP) of the inventory spot available in the respective broadcasting channel. Further, the one or more broadcasting channels may be listed either in an ascending or descending order of CPRP of the inventory spot. As an example and not as a limitation, the tool 118 generates the list of one or more broadcasting channels using an algorithm_1.

Algorithm_1 comprises receiving a cost of a ten second spot from a particular broadcasting channel as A, receiving a television rating (TVR) of the ten second spot for a particular target audience as B and calculating a Cost Per Rating Point (CPRP) of the ten second spot ($CPRP_{spot}$), wherein the $CPRP_{spot}$=B/A. The tool 118 generates a file having one or more broadcasting channels in accordance with the calculated $CPRP_{spot}$.

In one embodiment, the tool 118 generates the file having a list of one or more broadcasting channels in accordance with the various variables, such as the cost efficiency variable, stability variable, television ratings variable, relative television ratings variable and/or the like. As an example and not as a limitation, the tool 118 generates the list of one or more broadcasting channels using an algorithm_2.

Algorithm_2 comprises receiving one or more inventory spots using the first information, calculating $CPRP_{spot}$ of each of the inventory spots, selecting the minimum value of the $CPRP_{spot}$ and define it as $CPRP_{min}$, and defining a cost efficiency variable as $CPRP_{spot}/CPRP_{min}$. Accordingly, the tool 118 is configured to generate a file having a list of one or more broadcasting channels in according to decreasing or increasing cost efficiency variable.

As an example and not as limitation, the tool 118 generates the list of one or more broadcasting channels using an algorithm_3. The following describes the algorithm_3. The algorithm_3 comprises defining stability of the inventory spot TVR as a standard deviation of the inventory spot TVR in the specified target audience (TA) over a predetermined time period or mean TVR in the specified TA over the predetermined time period, receiving one or more inventory spots using the first information, calculating $Stability_{spot}$ of each inventory spot of the one or more inventory spots, selecting the minimum value of the $Stability_{spot}$ and defining it as $stability_{min}$, defining a stability efficiency variable for each spot as $Stability_{spot}/Stability_{min}$ and generating the file that lists one or more broadcasting channels according to the stability efficiency variable.

As an example and not as a limitation, the tool 118 generates the list of one or more broadcasting channels using an algorithm_4. The algorithm_4 comprises defining $TVR_{spot}$ as the TVR of the spot calculated on the specified target audience (TVR=Person minutes watched/Person minutes available), receiving one or more inventory spots using the first information, calculating $TVR_{spot}$ of each inventory spot of the one or more inventory spots, selecting the maximum value of the $TVR_{spot}$ and define it as $TVR_{max}$, defining a popularity index variable=$TVR_{max}/TVR_{spot}$ and generating the file that lists one or more broadcasting channels according to the popularity index variable.

As an example and not as a limitation, the tool 118 generates the list of one or more broadcasting channels using an algorithm_5. The algorithm_5 comprises receiving one or more inventory spots using the first information, receiving the inventory spot TVR for the target audience, receiving the inventory spot TVR for a universal audience, defining a relative TVRspot as received inventory spot TVR for target audience/received inventory spot TVR for universal audience*100, calculating the relative TVRspot for each spot of the one or more inventory spots, selecting the maximum value of the relative TVRspot and defining it as Relative TVRmax, defining a relative popularity index variable as Relative TVRmax/TVRspot and generating the file that lists one or more broadcasting channels in accordance with the relative popularity index variable.

Additionally and/or alternatively, the tool 118 defines another variable Y that includes varying percentage of aforementioned variables. Subsequently, the tool 118 generates a file having the list of one or more broadcasting channels according to the variable Y.

As an example and not as a limitation, the variable Y is calculated using the following equation.

Variable Y=a*((((CPRP spot)/CPRP Min)*100))+b*((((Stability spot)/Stability Min)*100))+c*((((TVR Max)/TVR Spot)*100))+d*((((Relative TVR Max)/Relative Index Spot)*100)), where, "a", "b", "c" and "d" are relative coefficients and the relative coefficients define relative importance of the aforementioned variables in the variable Y. In one embodiment, the survey data 120 includes values of the relative coefficients.

According to one or more embodiments of the invention, the user selects the one or more inventory spots in the one or more broadcasting channels and thereby assigns one or more multimedia advertisements for the one or more inventory spots. The one or more multimedia advertisement may be user generated multimedia advertisements. Additionally, the user assigns the multimedia advertisement according to the geographical locations of the broadcasting channels. For example, the user assigns one multimedia advertisement for one geographic location and further assigns another multimedia advertisement for another geographic location of the same broadcasting channel for a particular inventory spot.

According to one or more embodiments, the user edits the selected number of the inventory spots after the creation of the schedule. Further the use r can modify the advertisements assigned to the one or more inventory spots of the schedule. In some embodiments, the system allows the user to assign multiple advertisements for a campaign that has been booked. In addition one or more advertisements are assigned for a particular inventory spot.

Alternately, the system 100 automatically generates a plan for scheduling a multimedia advertisement. For example, the system 100 utilizes the agent 116 that selects the one or more inventory spots for the user using the tool 118, the survey data 120 and the user data 136. In one embodiment, the agent 116 may select the one or more inventory spots using the aforementioned algorithms. Accordingly, the agent 116 schedules the multimedia advertisement for the one or more inventory spots. For example, the agent 116 schedules the multimedia advertisement in accordance with the campaign timing data.

According to one or more embodiments of the invention, the user plans the schedule of the multimedia advertisement in various media channels, such as, television channels, print, Internet, cinema, radio channels, video on demand service channels, online video streaming channels, internet television channels, outdoor advertisement channels and/or other electronic multimedia channels generally known in the art. In one embodiment, the user may review the scheduled plan of the multimedia advertisement and additionally, may edit the scheduled plan of the multimedia advertisement. The user may edit the scheduled plan of the multimedia advertisement, for example, by altering the previously selected one or more broadcast channels or altering the one or more previously selected inventory spots.

According to an embodiment, a unique identification tag is associated with each valid user of the system 100. Additionally, the system 100 allows a user to plan a schedule of one or more multimedia advertisements using a single user identification tag. The multimedia advertisement may belong to a single brand and product or to different brands and different products. A campaign or a schedule that is created for a particular brand is isolated from a campaign or schedule of another brand created with the same user identification tag.

According to one or more embodiments of the invention, the user accesses an advertisement generator for generating the multimedia advertisement. The advertisement generator includes various computing resources, such as, hardware resources, software resources, multimedia data (e.g., audio data, video data and/or the like) and/or the like and thereby enables the user to generate the multimedia advertisement. In one embodiment, the advertisement generator tool is the advertisement generator disclosed in the provisional patent application titled "Method and apparatus for generating a multimedia advertisement" being co-filed with this application.

According to various embodiments, the system 100 may replace the existing multimedia advertisements at the one or more inventory spots with the scheduled multimedia advertisement, for example, using a splicing operation and thereby enables the user to display scheduled multimedia advertisements on the one or more broadcasting channels. In one embodiment, the splicing operation is accomplished by the splicer disclosed in the provisional patent application titled "Method and apparatus for splicing a compressed data stream" being co-filed with this application.

Alternatively, the system 100 may replace the existing multimedia advertisements at the one or more inventory spots with the scheduled multimedia advertisement in various media channels, such as television channels, print, internet, cinema, radio channels, video on demand service channels, online video streaming channels, Internet television channels, outdoor advertisement channels and/or other electronic multimedia channels generally known in the art.

Figure 2:
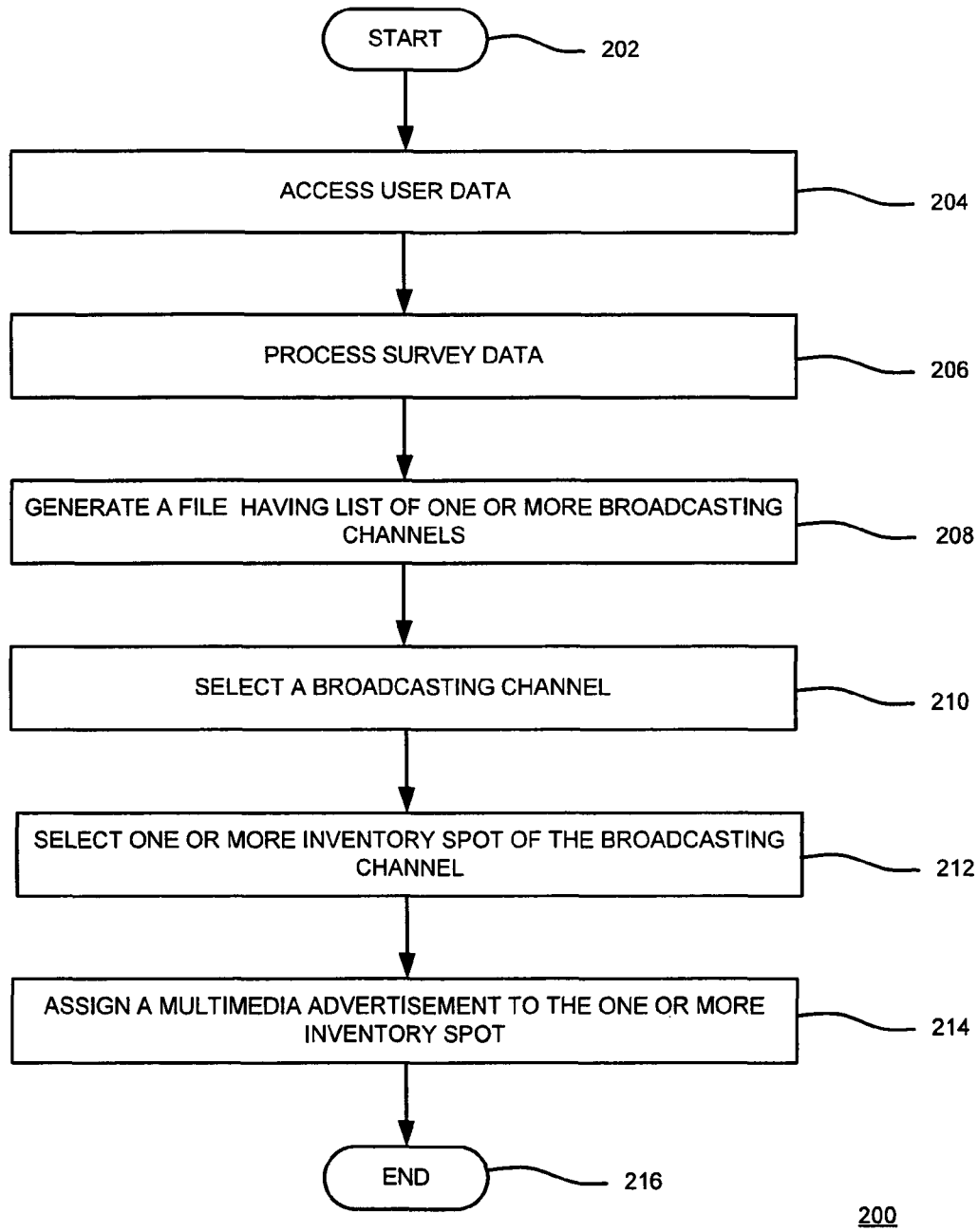
FIG. 2 illustrates a flow diagram illustrating a method for planning a schedule of a multimedia advertisement in one or more broadcasting channels in accordance with an embodiment of the invention.

FIG. 2 illustrates an example flow diagram illustrating a method 200 for planning a schedule of a multimedia advertisement in one or more broadcasting channels in accordance with one or more embodiments of the invention. The method 200 starts at step 202 and proceeds to step 204. At step 204, user data (e.g., the data 136 of the FIG. 1) is accessed.

At step 206, survey data (e.g., the survey data 120 of the FIG. 1) is processed. In one embodiment, the survey data is analyzed in accordance with the user data. At step 208, a file having a list of one or more broadcasting channels is generated using the survey data. For example, the file includes one or more broadcasting channels and their respective rankings based on Cost Per Rating Point (CPRP) of the spot. Additionally, the file includes one or more broadcasting channels and their respective rankings based on various variables, such as the cost efficiency variable, stability variable, television ratings variable, relative television ratings variable and/or the like. In one embodiment, the file includes one or more broadcasting channels and their respective rankings based on a variable Y.

At step 210, a broadcasting channel among the one or more broadcasting channels is selected. In one embodiment, the file includes one or more inventory spots of the one or more broadcasting channels. At step 212, the one or more inventory spots of selected broadcasting channel are selected. For example, the user and/or an agent (e.g., the agent 116 of the FIG. 1) select the one or more inventory spots of the broadcasting channel. At step 214, a multimedia advertisement file is assigned to each of the selected one or more inventory spots. For example, the user and/or the agent assign the multimedia advertisement file to the one or more inventory spots of the broadcasting channel. The method 200 proceeds to step 216. At step 216, the method 200 ends.

Figure 3C:
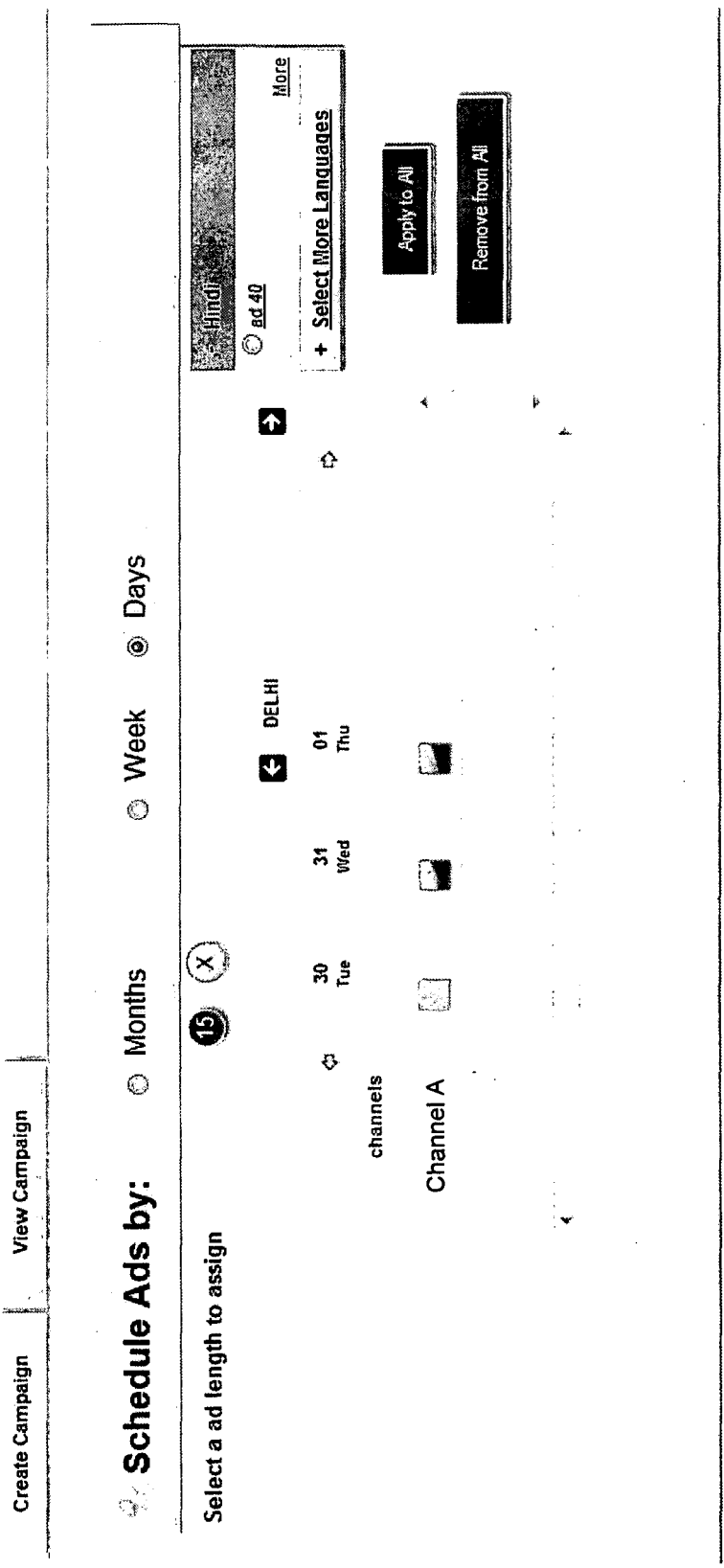
FIG. 3C illustrates a graphical user interface (GUI) in accordance with another embodiment of the invention.

FIG. 3A-C illustrate examples of graphical user interfaces (GUIs) in accordance with one or more embodiments of the invention. FIG. 3A illustrates an example of a graphical user interface for providing access to the user for providing or selecting one or more inventory spots in the one or more broadcasting channels. FIG. 3B illustrates another example of a graphical user interface providing access to the user for providing or selecting one or more inventory spots in the one or more broadcasting channels. FIG. 3C illustrates another example of a graphical user interface providing access to the user for assigning a multimedia advertisement to the one or more inventory spots of the one or more broadcasting channels.

Further, various embodiments discussed herein enable a method of doing business, wherein advertisements may be inserted into an advertisement stream such that the inserted advertisements are shown in relatively smaller geographical area, e.g. an area pertaining to a cable head end. The inserted advertisements may be different than the original broadcasted advertisements. This has various advantages for advertisers, broadcasters and the viewers, and such a method of doing business is disclosed in provisional patent application "Method and system for broadcasting multimedia data" being co-filed with this application. Various embodiments discussed herein, provide several advantages to such a business method, especially in allowing advertisers to choose optimal scheduling of their advertisements across various media channels, such as, television channels, print, internet, cinema, radio channels, video on demand service channels, online video streaming channels, Internet television channels, outdoor advertisement channels and/or other electronic multimedia channels generally known in the art.

While the foregoing is directed to embodiments of the present invention, other and further embodiments of the invention may be devised without departing from the basic scope thereof.

The invention claimed is:

1. A computer implemented method for planning a schedule of a multimedia advertisement in a network, the method comprising:
    accessing user data of a user on a server;
    processing, on a server, a survey data according to the user data;
    generating a list including a broadcasting channel from a plurality of broadcasting channels of the network, wherein the list is generated based on a relative popularity index variable and a stability variable;
    creating a single user identification for the user, wherein the single user identification is to manage multiple schedules of at least one product,
    wherein the relative popularity index variable defined as relative $TVR_{max}$/relative $TVR_{spot}$, wherein relative $TVR_{spot}=100*(TVR_{spot}$ for target audience/$TVR_{spot}$ for all audience) is calculated for each of a plurality of inventory spots, a maximum value from each of the relative $TVR_{spot}$ for each of the plurality of inventory spots is selected as relative $TVR_{max}$, and
    wherein the list includes at least one inventory spot from the plurality of inventory spots each associated with a plurality of instances of the broadcasting channel displayed at a corresponding plurality of geographic locations, the at least one inventory spot associated with at least one spliced stream obtained from the plurality of instances of the broadcasting channel; and
    selecting the at least one inventory spot associated with the at least one broadcasting channel for the multimedia advertisement.

2. The method of claim 1 further comprises assigning at least one multimedia advertisement to the at least one inventory spot for at least one geographic location from the plurality of geographic locations for the at least one broadcasting channel.

3. The method of claim 1, wherein the user data comprises data regarding at least one of: target audience, business category, industry specification, demographic preference, broadcasting channels preference and a combination thereof.

4. The method of claim 1, wherein the survey data comprises data regarding at least one of: television ratings, market reviews, inventory spot rating, broadcasting channel rating and a combination thereof.

5. The method of claim 1, wherein the list of the at least one broadcasting channel is generated by an algorithm that utilizes the survey data and the user data.

6. The method of claim 1, wherein the list of the at least one broadcasting channel is arranged according to a ranking of each of the at least one broadcasting channel computed by the algorithm.

7. The method of claim 6, wherein the ranking of each of the at least one broadcasting channel is computed by the algorithm using the survey data.

8. The method of claim 1, wherein the at least one inventory spot is selected by the user.

9. The method of claim 8, wherein the at least one inventory spot selected by the user is altered by the user.

10. The method of claim 1, wherein the stability represents a standard deviation of the inventory spot TVR in a specified target audience (TA) over a predetermined time period or mean TVR in the specified TA over the predetermined time period.

11. The method of claim 1, wherein the list is generated further based on a cost efficiency variable.

12. The method of claim 11, wherein the at least one inventory spot selected is not the spot with the highest relative $TVR_{spot}$.

13. An apparatus for planning a schedule of a multimedia advertisement over a network, comprising:
    a processor;
    an agent software module processed by the processor for accessing a user data of a user, wherein the agent software module creates a single user identification for the user, which is to manage multiple schedules of at least one product; and
    a tool software module processed by the processor for processing a survey data according to the user data, wherein the tool generates a list including a broadcasting channel from a plurality of broadcasting channels of the network,
    wherein the list is generated based on a relative popularity index variable and a stability variable, wherein the relative popularity index variable defined as relative $TVR_{max}$/relative $TVR_{spot}$, wherein relative $TVR_{spot}=100*(TVR_{spot}$ for target audience/$TVR_{spot}$ for all audience) is calculated for each of a plurality of inventory spots, each associated with a plurality of geographic locations, a maximum value from each of the relative $TVR_{spot}$ for each of the plurality of inventory spots is selected as relative $TVR_{max}$, and wherein the list includes at least one inventory spot from the plurality of inventory spots each associated with a plurality of instances of the broadcasting channel displayed at a corresponding plurality of geographic locations, the at least one inventory spot associated with at least one spliced stream obtained from the plurality of instances of the broadcasting channel.

14. The apparatus of claim 13 further comprises a computer node that allows the user to assign at least one multimedia advertisement to the at least one inventory spot.

15. The apparatus of claim 14, wherein the computer node allows the user to select the at least one inventory spot.

16. The apparatus of claim 13, wherein the stability variable represents a standard deviation of the inventory spot TVR in a specified target audience (TA) over a predetermined time period or mean TVR in the specified TA over the predetermined time period.

17. The apparatus of claim 13, wherein the list is generated further based on a cost efficiency variable.

* * * * *